No Printed Specification Available
9038X
B. Wales,
Horse Power.
Patented Aug. 17, 1835.
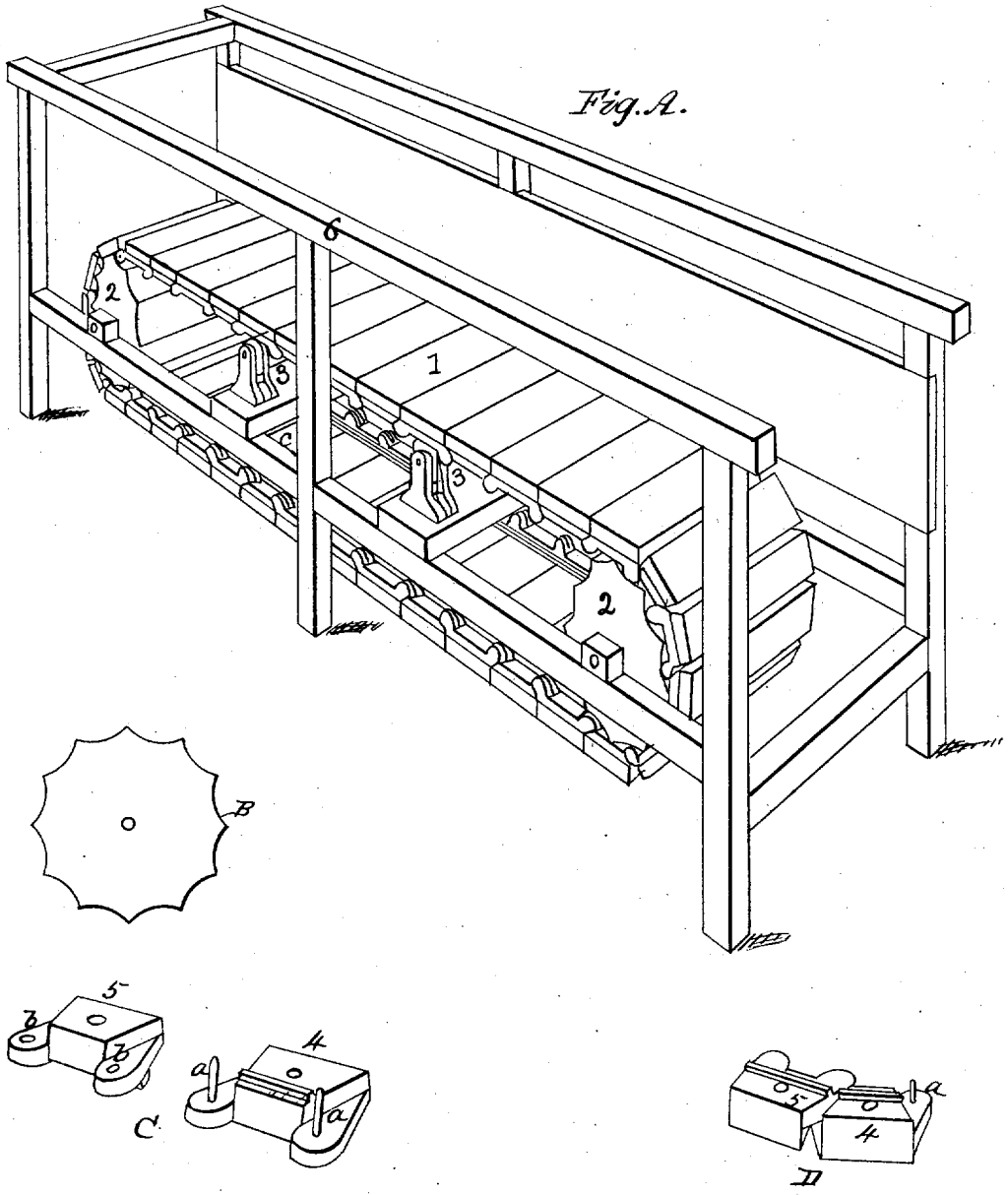
AM. PHOTO-LITHO. CO. N.Y. (OSBORNE'S PROCESS)

10 [illegible] Aug 17 1833 [illegible]

Benjamin Wales Hallowell Maine
Letters Patent

The schedule referred to in these Letters Patent and making part of the
same containing a description in the words of the said Benjamin
Wales himself of his improvement in the endless Chain Horse Power To all to whom these Presents shall come
Be it known that I Benjamin Wales of Hallowell in the County of Kenne-
-bec and State of Maine have invented a new and useful improvement
in the "Horse Power" and that the following is a full and exact description
thereof. Fig A of the accompanying drawings which are referred to and
made a part of this description represent the whole of this machine ready for
operation and consists of a frame which has four horizontal bars nine
feet long and four cross bars two feet long, and six upright posts with
side pieces running the whole length of the frame. The length of the side
bars give the length of the machine and the cross bars its breadth which
may be varied [illegible] those who use the same.
Fig 1 represents the slats in the Chain which are to be of wood or may be of
either of cast or wrought iron or a part of either and made fast at both ends
to the links of the Chain Fig 2.2. represent the two wheels over which the chain
passes which are to be made of cast iron sixteen inches more or less in diame-
-ter Fig 3.3. represent two smaller wheels six inches in diameter more or
less which serve to support the Chain in the centre standing on plank running
from one of the lower side bars to the other and supported in a frame Fig C
represents the Chain in its place, which is formed by a succession of hinge
pieces connected together so as to form an endless Chain this is to be of
cast iron or other suitable material Fig 13 represents the wheel apart from
the machine which has on its outer edge a flange lip or projection to meet
and support each link of the chain and [illegible] it in its revolution
Fig C represents two links of the Chain separately and Fig D represents
them connected with a pin, forming a hinge piece, Fig 4 of C & D 74. 9038X represent the form of one of the links with the pins, a a, which are intended to enter the corresponding orifices b b, when the links are put together as in Fig [illegible] Fig. 5.5. of C and 5 of D, represent the form of the corresponding link with the orifices. The end of any of the links may be formed with a triangular [illegible] or tongue with a shoulder made to fit into a mortice in the end of the corresponding link and the two connected together by the pin, a, and when thus coupled make one piece of the chain or the end of the link 4. with the pins a, a, may project leaving a shoulder which meets a corresponding projection and shoulder in 5 with the orifices, the two ends of the corresponding links being halved together and fastened with the pin a, and when thus united forming one piece of the chain and so one hinge piece after another are coupled until the whole succession is formed into an endless chain, This latter form is adopted in in the model and drawings, When worked the two [illegible] together make a firm support for the horse where power is to turn the chain, and which travels upon the slats above described The number of wheels under the chain may be twice more and they are intended as well to keep the chain in its place and prevent vibration as to sustain it, The chain as it passes over these wheels forms a railway as is shown at Fig 5 of D and this railway is a part of the link of the chain and is cast with it The projecting of the links of the chain fitting into the corresponding indentures between the lips of the end wheels give motion to these wheels and the machinery attached to it and the power is communicated to machinery by means of a cog wheel or band wheel attached to the shaft of either of the wheels 22, The pin a, in 4 of Fig. C may be cast with the link or it may be of wrought iron and driven through both ends of the links or the two may be fastened with a screw I claim as new and of my own invention both described modes of forming the hinge and the peculiar form of the link, I claim the forming of the end wheels with the lips or projecting & the mode of communicating power by the projections of the chain fitting into the indentures between the projections of the wheels, I also claim the mode of sustaining the chain and keeping it in its place by means of the railway and small wheels as above described Witnesses { John [illegible]
{ J. Tony Scammon Benj. Wales 945 [illegible]

Ex
C.S.W.

Drawing